Jan. 12, 1971   J. L. JARRETT   3,553,874
PHOTOGRAPHIC SLIDE FILE AND VIEWER
Filed Sept. 27, 1968
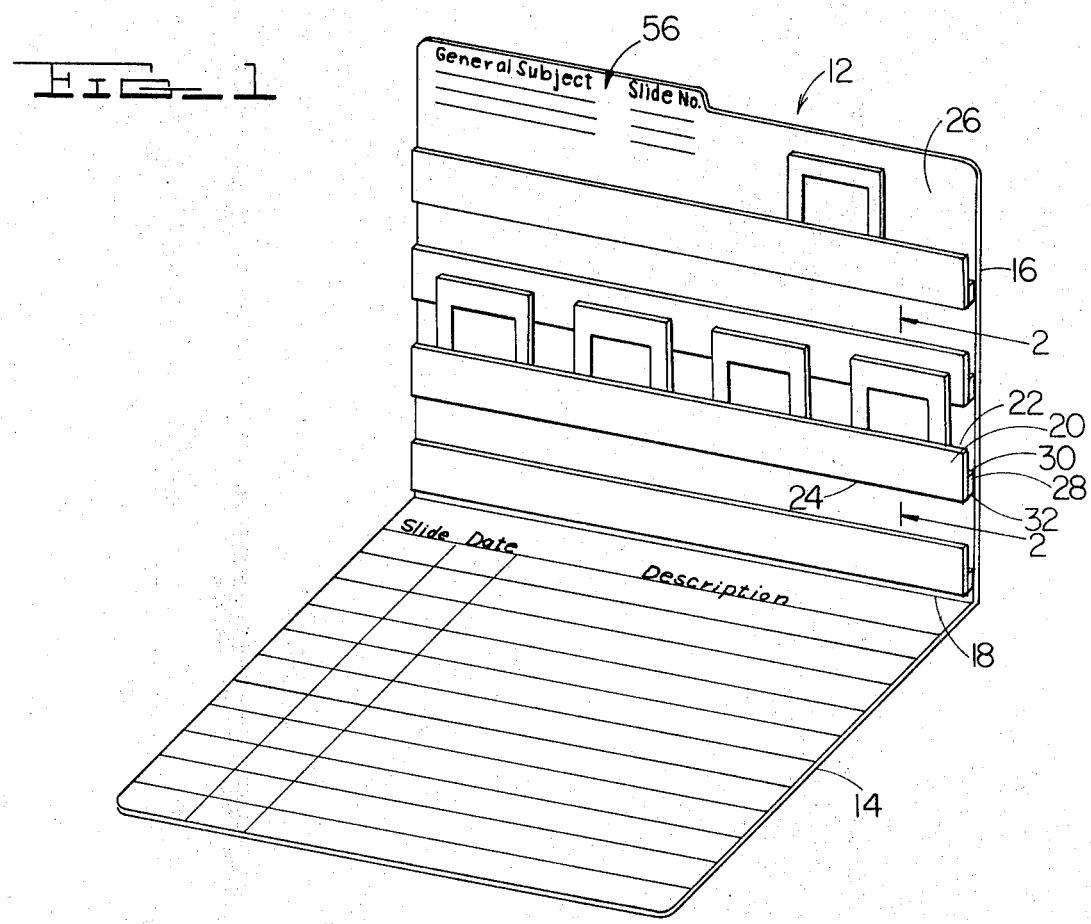
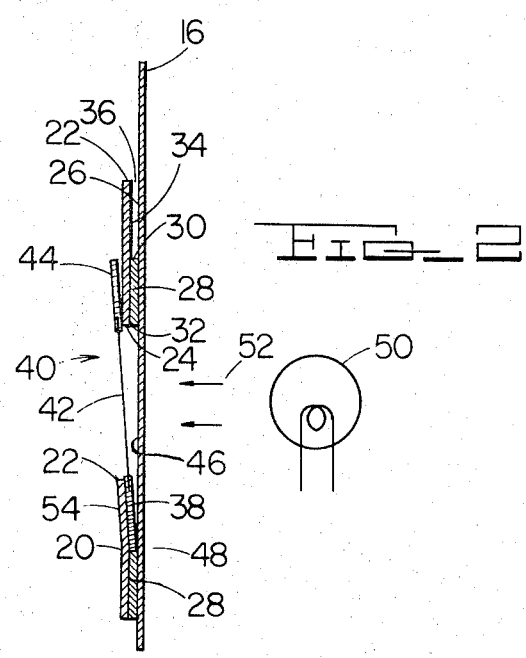
INVENTOR
JOHN L. JARRETT
BY Wood, Dusk, Irish & Lundy
ATTORNEYS ically
United States Patent Office 3,553,874
Patented Jan. 12, 1971

3,553,874
PHOTOGRAPHIC SLIDE FILE AND VIEWER
John L. Jarrett, U.S.A.I.D., P.O. Box 9130,
DARes Salaam, Tanzania
Filed Sept. 27, 1968, Ser. No. 763,250
Int. Cl. G09f 1/10
U.S. Cl. 40—158                                      6 Claims

ABSTRACT OF THE DISCLOSURE

A photographic slide file and viewer in which a plurality of spaced, parallel, elongated strips are attached to the inner surface of the back flap of a manila folder, the strips defining slots for removably receiving one side of the mounts of conventional photographic slides in side-by-side relationship so that the slides may be viewed by holding the back flap of the folder to the light thus permitting arrangement of the slides. The front flap of the folder in its folded position covers the strips and the slides contained therein thus permitting filing of the slides in a file drawer.

BACKGROUND OF THE INVENTION

Field of the invention

This invention relates generally to devices for viewing, arranging and filing photographic slides, and more particularly to a slide file folder and a viewer.

Description of the prior art

Photographic slides have conventionally been filed, after arrangement in the desired sequence, in boxes having a plurality of slots for accommodating the slides. In the use of such conventional slide file boxes or trays, it has been necessary to prearrange the slides by the use of a conventional slide viewer, or a conventional back-lighted transparent or translucent glass plate.

Various record keeping systems have been proposed for removably attaching cards or slips of paper to a file folder thereby permitting organization and filing of the cards or slips, the arrangement shown in Pat. No. 1,378,-959 being typical.

To the best of the present applicant's knowledge, no system for filing photographic slides in file folders, as opposed to boxes and trays, is available or has been proposed.

SUMMARY OF THE INVENTION

I have provided a viewing and filing system for conventional photographic slides in which the slides are removably attached to a conventional manila file folder thus permitting viewing and arranging of the slides by holding the folder to the light, and subsequent filing of the organized slides in a conventional file drawer.

The invention, in its broader aspects, therefore comprises a sheet of relatively thin, self-supporting material having light transmissive properties. A strip having upper and lower longitudinal edges is provided and means are provided for attaching a lower portion of the strip adjacent its lower edge to one surface of the sheet with the upper edge and the upper portion adjacent thereto being spaced from the surface of the sheet and defining an upwardly facing slot therewith. A conventional photographic slide is provided having a centrally disposed transparency portion bounded by a mounting portion. The slide has one side of its mounting portion removably seated in the slot with the transparency portion being positioned above the upper edge of the strip and adjacent the one surface of the sheet thereby retaining the slide while permitting viewing thereof by light transmitted through the sheet.

It is accordingly an object of the invention to provide an improved photographic slide file and viewer.

Another object of the invention is to provide a system for viewing, arranging and filing slides in a flat file folder.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a perspective view showing the photographic slide file and viewer of the invention; and FIG. 2 is a fragmentary cross-sectional view taken generally along the line 2—2 of FIG. 1.

DESCRIPTION OF THE PREFERRED EMBODIMENT

Referring now to the figures of the drawing, the improved photographic slide file and viewer of the invention, generally indicated at 10 comprises a conventional file folder 12 having front and back flaps 14 and 16 folded along line 18 in conventional fashion. In a specific embodiment of the invention, the file folder 12 is a commercially available item formed of relatively thin, self-supporting manila cardboard, such material having adequate light-transmissive properties for the intended purpose. It will be readily understood that any other suitable relatively thin, self-supporting sheet material may be employed having light-transmissive properties equal or better than manila cardboard.

A plurality of elongated strips 20 are provided respectively having upper and lower longitudinal edges 22 and 24. Strips 20 are formed of relatively thin, self-supporting material and in the specific embodiment are formed of coated cardboard. Each of the strips 20 is attached to and spaced from the front surface 26 of the back flap 16 of file folder 12 by means of another elongated strip 28 having upper and lower longitudinal edges 30 and 32.

As best seen in FIG. 2, the lower edges 24, 32 of the respective strips 20, 28 are generally in alignment. Strips 28 are narrower than strips 20 so that the upper edge 30 of each strip 28 is spaced below the upper edge 22 of the respective strip 20 so that the upper edge 22, the upper edge 30 of the respective strip 28, and the surface 26 mutually define an upwardly facing slot 36. Each of the respective strips 20, 28 are parallel with the fold line 18, the strips 20 being spaced apart, one over the other, as shown.

Each of the upwardly facing slots 36 is proportioned removably to receive one side 38 of the mount of a conventional 35 millimeter photographic slide 40 with the transparency 42 positioned above the upper edge 22 of the respective strip 20. The strips 20 and their respectively associated mounting strips 28 are respectively vertically spaced apart by distances generally corresponding to one dimension of the slide transparency 42. In the specific embodiment, the spacing between the adjacent upper and lower edges 22, 24 generally corresponds to the shorter dimension of the transparency 42.

In this specific embodiment, four such strips 20, 28 are provided thus, in the case of a conventional letter-size file folder which is 11¾ inches wide, five conventional slides which are two inches square can be accommodated in side-by-side relationship in each slot 36. Thus, twenty such slides which result from one twenty exposure roll of film can be accommodated by one folder. It will be seen that in the case of each of the three lower strips 20, 28, the bottom side 38 of each mount will be received within the respective slots 36 while the opposite upper side 44 will engage the outer surface of the next adjacent higher strip 20, as seen in FIG. 2. It will be seen that the adjacent upper and lower edges 22 and 24 expose a portion 46 of surface 26, the transparency 42 of a slide so received thus being adjacent and exposed to the portion 46. It will thus been seen that when the rear surface 48 of the back flap 16 is held up to a source of light, shown schematically at 50, the slide 40 can be viewed by the light transmitted from the light source 50 through the flap 16, as indicated by the arrows 52.

It will be seen that the portion 54 of each strip 20 above the respective strip 28 has sufficient flexibility to permit the respective slide to be inserted in the slot 36 and to engage the outer surface of the next higher strip 20, as shown in FIG. 2. It will further be seen that the slide received in the slot 36 of the uppermost strips 20, 28 will lie substantially flat against the surface 26 of the back flap 16. In the specific embodiment the adjacent strips 20 are spaced vertically apart by approximately 15/16 inch which corresponds to the shorter dimension of the transparency of a conventional slide, the longer dimension being approximately 1 3/8 inch.

It will be seen that the inner surface 26 of the back flap 16 may have suitable indicia 56 thereon indicating the general subject of the slides together with their associated slide numbers, while the inner surface of the front flap 14 may likewise have suitable indicia indicating the numbers of the slides, the dates the photographs were taken, and the description of each slide.

It will now be seen that a group of slides, for example twenty slides developed from one twenty-exposure roll of film, may initially be inserted in the slots 36 in random fashion. The back flap 16 may then be held to the light for viewing the slides and the slides rearranged in the desired sequence with numbers being assigned thereto which can simultaneously be marked upon the slide and its corresponding position on the respective strip 20. It will further be seen that once the slides have been so arranged, the front flap 14 will fold so as to cover the strips 20 and the slides retained thereby thus providing a flat file of the slides which can be filed in the file drawer of a conventional file cabinet.

While the invention has been illustrated and described in conjunction with a conventional file folder, the specific embodiment utilizing a standard letter-size file folder which will conveniently accommodate four of the strips 20 each retaining five conventional 35 millimeter slides in side-by-side relationship, it will be readily apparent that other standard or nonstandard size folders may be employed for accommodating a greater or lesser number of slides, as desired.

While there have been described above the principles of this invention in connection with specific apparatus, it is to be clearly understood that this description is made only by way of example and not as a limitation to the scope of the invention.

What is claimed is:

1. In combination: a sheet of relatively thin self-supporting material having light transmissive properties; a strip having upper and lower longitudinal edges; means for attaching a lower portion of said strip adjacent said lower edge to one surface of said sheet with said upper edge and upper portion adjacent thereto being spaced from said surface and defining an upwardly facing slot therewith; and a photographic slide having a centrally disposed transparency portion bounded by a mounting portion, said slide having one side of said mounting portion removably seated in said slot with said transparency portion being substantially positioned above said upper edge and adjacent said surface thereby retaining said slide while permitting viewing of the same by light transmitted through said sheet, said strip being longitudinally elongated so that said slot will accommodate at least one additional slide in side-by-side relationship with said first-named slide, said sheet comprising a first portion to which said strip is attached and a second portion adapted to be folded along a line parallel with said strip over at least a part of said first portion to cover said strip and the slides in said slot thereby forming a folder for filing said slides.

2. The combination of claim 1 wherein said attaching means comprises another strip having upper and lower edges, said other strip being adhered to said one surface of said sheet, said first-named strip being adhered to said other strip with the lower edges of both of said strips being generally in alignment, said other strip being narrower than said first strip with its upper edge spaced below the upper edge of the first strip thereby to form said slot.

3. The combination of claim 1 further comprising a second strip having upper and lower longitudinal edges; second means for attaching a lower portion of said second strip adjacent its lower edge to said one surface of said sheet with its upper edge and upper portion adjacent thereto being spaced from said surface and defining a second upwardly facing slot therewith for removably receiving one side of the mounting portion of another slide, the lower edge of said second strip being spaced above the upper edge of said first-named strip thereby exposing a portion of said one surface of said sheet, the side of said mounting portion of said first-named slide opposite said one side engaging the outer surface of said second strip with said transparency portion thereof being exposed to said exposed portion of said one side of said sheet for viewing.

4. The combination of claim 3 wherein said lower edge of said second strip is spaced from said upper edge of said first strip by substantially one transverse dimension of said first slide.

5. The combination of claim 4 wherein each of said first and second strips is longitudinally elongated so that said first and second slots will respectively accommodate a plurality of slides in side-by-side relationship, each of said attaching means comprising another longitudinally elongated strip having upper and lower edges, each of said other strips being adhered to said one surface of said sheet and having the respective first and second strips adhered thereto with their lower edges respectively generally in alignment with the lower edges of the other strips, said other strips being respectively narrower than said first and second strips with their upper edges respectively spaced below the upper edges of said first and second strips to form said first and second slots.

6. A device for filing and viewing photographic slides comprising a folder formed of relatively thin, self-supporting material and having first and second portions adapted to be folded along a line, at least said first portion having light-transmissive properties; at least two elongated strips each having upper and lower longitudinal edges, and means for attaching a lower portion of each of said strips adjacent its lower edge to one surface of said first portion of said sheet with the upper edges of said strips and the upper portion adjacent thereto being spaced from said surface and respectively defining upwardly facing slots therewith for removably receiving one side of the mounting portions of photographic slides in side-by-side relationship with the transparency portions thereof positioned above the respective upper edges and adjacent said surface thereby retaining said slides while permitting viewing of the same by light transmitted through said first portion, said strips being spaced apart one above the other and parallel with said fold line and said slots facing away therefrom; said second portion of said sheet being adapted to be folded along said line over at least a part of said first portion to cover said strips and the slides in said slots for filing said slides, said strips being spaced apart by generally one transverse dimension of the transparency portion of a said slide whereby a said slide which has the said one side of its mounting portion received in the slot defined by the lower one of said strips has its opposite side engaging the outer surface of the upper one of said strips.

References Cited

UNITED STATES PATENTS

| 1,361,703 | 12/1920 | Fennelli | 40—158 |
| 1,730,883 | 10/1929 | Grant | 40—158 |
| 2,775,050 | 12/1956 | Ellsworth | 40—159 |
| 2,828,567 | 4/1958 | Shoan | 40—63A |
| 2,888,762 | 6/1959 | Westphal | 40—64A |
| 3,336,690 | 8/1967 | Walter et al. | 40—64AX |

JEROME SCHNALL, Primary Examiner

W. J. CONTRERAS, Assistant Examiner